United States Patent
Shim et al.

(10) Patent No.: US 12,301,717 B2
(45) Date of Patent: May 13, 2025

(54) ELECTRONIC DEVICE AND MEMORY PROTECTION METHOD USING SAME

(71) Applicants: Samsung Electronics Co., Ltd., Suwon-si (KR); KOREA UNIVERSITY RESEARCH AND BUSINESS FOUNDATION, Seoul (KR)

(72) Inventors: Dongwook Shim, Suwon-si (KR); Donghoon Lee, Seoul (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 280 days.

(21) Appl. No.: 18/172,747

(22) Filed: Feb. 22, 2023

(65) Prior Publication Data

US 2023/0198759 A1    Jun. 22, 2023

Related U.S. Application Data

(63) Continuation of application No. PCT/KR2021/015343, filed on Oct. 28, 2021.

(30) Foreign Application Priority Data

Oct. 29, 2020   (KR) .......................... 10-2020-0141764

(51) Int. Cl.
*H04L 9/32*      (2006.01)
*G06F 3/06*     (2006.01)

(52) U.S. Cl.
CPC .............. *H04L 9/32* (2013.01); *G06F 3/0622* (2013.01); *G06F 3/0637* (2013.01); *G06F 3/0673* (2013.01)

(58) Field of Classification Search
CPC ....... H04L 19/32; G06F 3/0622; G06F 3/0637
See application file for complete search history.

(56) References Cited

U.S. PATENT DOCUMENTS 9,436,619 B2 *  9/2016  Woolley ................... G06F 9/547
9,688,279 B2 *  6/2017  Kelly .............. B60W 30/18172
(Continued)

FOREIGN PATENT DOCUMENTS

JP      2019-144794 A    8/2019
KR      10-1155123 B1    6/2012
(Continued)

OTHER PUBLICATIONS

International Search Report dated Feb. 9, 2022, issued in International Patent Application No. PCT/KR2021/015343.

*Primary Examiner* — Viral S Lakhia
(74) *Attorney, Agent, or Firm* — Jefferson IP Law, LLP

(57) ABSTRACT

An electronic device is provided. The electronic device includes a memory and a processor, the processor allocates first and second address spaces (AS) to the memory in rich execution environment (REE) when detecting a request to write data, writes the data to the first AS and detect access to the second address space in the REE, configures access permission of a first user virtual memory AS (VMAS), mapped to the first address space, in the REE so that write access is deactivated by a trusted environment manager when detecting access to the second AS, configures access permission of a second user VMAS, mapped to the second AS, in the REE so that read access is activated and write access is deactivated, and configures access permission of a first kernel VMAS, mapped to the first AS, in the REE so that write access is deactivated by the trusted environment manager.

20 Claims, 6 Drawing Sheets

(56) References Cited

U.S. PATENT DOCUMENTS

| | | | |
|---|---|---|---|
| 10,114,768 B2* | 10/2018 | Hildesheim | G06F 12/1491 |
| 10,489,308 B2* | 11/2019 | Bear | G06F 12/1063 |
| 10,514,943 B2* | 12/2019 | Asbe | G06F 21/79 |
| 10,606,769 B2* | 3/2020 | Yu | G06F 12/1027 |
| 10,673,616 B2* | 6/2020 | Cammarota | H04L 9/14 |
| 10,705,894 B2 | 7/2020 | Jeon et al. | |
| 10,970,401 B2* | 4/2021 | Willemse | G06F 12/1408 |
| 11,126,753 B2* | 9/2021 | Zhu | H04W 12/40 |
| 11,233,661 B2 | 1/2022 | Hwang et al. | |
| 11,416,619 B1* | 8/2022 | Paczkowski | G06F 21/575 |
| 11,443,034 B2* | 9/2022 | Li | G06F 21/57 |
| 11,783,055 B2* | 10/2023 | Hoogerbrugge | G06N 3/063 |
| | | | 713/193 |
| 11,824,643 B2* | 11/2023 | Choyi | H04L 63/0435 |
| 2009/0037929 A1 | 2/2009 | Shimko et al. | |
| 2016/0092678 A1 | 3/2016 | Probert et al. | |
| 2016/0188244 A1 | 6/2016 | Yang et al. | |
| 2016/0350543 A1 | 12/2016 | Kong et al. | |
| 2016/0364341 A1 | 12/2016 | Banginwar et al. | |
| 2017/0249260 A1 | 8/2017 | Sahita et al. | |
| 2018/0129525 A1* | 5/2018 | Hong | G06F 12/1009 |
| 2018/0129828 A1 | 5/2018 | Zeng et al. | |
| 2022/0309182 A1* | 9/2022 | Zao | G06F 21/6236 |

FOREIGN PATENT DOCUMENTS

| | | |
|---|---|---|
| KR | 10-1320739 B1 | 10/2013 |
| KR | 10-2016-0077851 A | 7/2016 |
| KR | 10-2016-0140159 A | 12/2016 |
| KR | 10-2017-0067740 A | 6/2017 |
| KR | 10-2017-0136406 A | 12/2017 |
| KR | 10-2019-0039603 A | 4/2019 |
| KR | 10-2075701 B1 | 2/2020 |
| KR | 10-2020-0104671 A | 9/2020 |

* cited by examiner

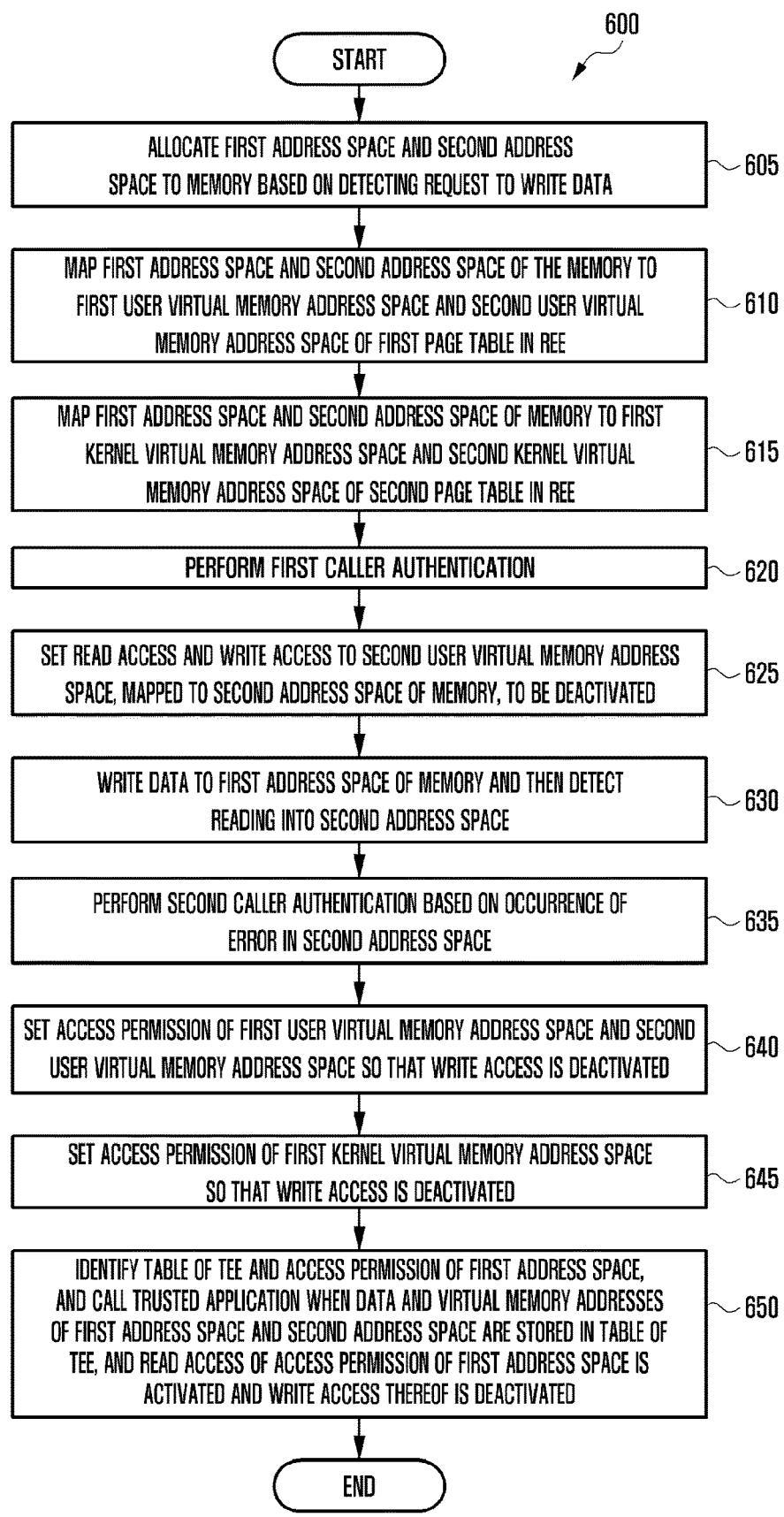

ELECTRONIC DEVICE AND MEMORY PROTECTION METHOD USING SAME

CROSS-REFERENCE TO RELATED APPLICATION(S)

This application is a continuation application, claiming priority under § 365 (c), of an International application No. PCT/KR2021/015343, filed on Oct. 28, 2021, which is based on and claims the benefit of a Korean patent application number 10-2020-0141764, filed on Oct. 29, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) KOREA UNIVERSITY RESEARCH AND BUSINESS FOUNDATION.

BACKGROUND

1. Field

The disclosure relates to an electronic device and a memory protection method using the same.

2. Description of Related Art

For secure execution of a trusted application, a technology for providing a trusted execution environment (TEE), such as advance reduced instruction set computer (RISC) machine (ARM) TrustZone technology, is being developed. In this technology, by executing a normal application in a rich execution environment (REE) or normal world and by executing the trusted application in the TEE or secure world isolated from the normal world, it is possible to guarantee safe execution of the trusted application. In addition, the normal application in the REE may store and transmit data required for communication with the trusted application in a shared memory, and the trusted application may also store processing results in the shared memory and notify the normal application of the stored processing results.

The above information is presented as background information only to assist with an understanding of the disclosure. No determination has been made, and no assertion is made, as to whether any of the above might be applicable as prior art with regard to the disclosure.

SUMMARY

As data integrity of the shared memory is not guaranteed and caller authentication is not performed for calls of the trusted application, an attacker may access the shared memory and manipulate data. To prevent this, it is possible to prevent an attacker from manipulating data through a method of encrypting the data in the shared memory. However, since it is necessary to have a symmetric key in the REE to encrypt the data in the shared memory, the symmetric key may be loaded into the memory in the REE while encryption is being performed. Accordingly, an attacker with kernel permission may leak a key by accessing the memory in the REE.

Aspects of the disclosure are to address at least the above-mentioned problems and/or disadvantages and to provide at least the advantages described below. Accordingly, an aspect of the disclosure is to provide an electronic device which writes data to a shared memory through a normal application in a REE, and may then control the access permission of the shared memory so that only read access is possible.

Additional aspects will be set forth in part in the description which follows and, in part, will be apparent from the description, or may be learned by practice of the presented embodiments.

In accordance with an aspect of the disclosure, an electronic device is provided. The electronic device includes a memory, and a processor configured to be operatively connected to the memory, wherein the memory may store instructions which, when executed, cause the processor to allocate a first address space and a second address space to the memory in a rich execution environment (REE) based on detecting a request to write data to the memory, write the data to the first address space of the memory and then detect access to the second address space in the REE, configure an access permission of a first user virtual memory address space, mapped to the first address space in the memory, in the REE so that write access is deactivated by a trusted execution environment (TEE) manager based on detecting the access to the second address space, configure an access permission of a second user virtual memory address space, mapped to the second address space, in the REE so that read access is activated and write access is deactivated, and configure an access permission of a first kernel virtual memory address space, mapped to the first address space in the memory, in the REE so that write access is deactivated by the TEE manager.

In accordance with another aspect of the disclosure, a method for protecting memory of an electronic device is provided. The method includes allocating a first address space and a second address space to the memory in a REE based on detecting a request to write data to the memory, writing the data to the first address space of the memory and then detecting access to the second address space in the REE, configuring an access permission of a first user virtual memory address space, mapped to the first address space in the memory, in the REE so that write access is deactivated by a TEE manager based on detecting the access to the second address space, configuring an access permission of a second user virtual memory address space, mapped to the second address space, in the REE so that read access is activated and write access is deactivated, and configuring an access permission of a first kernel virtual memory address space, mapped to the first address space in the memory, in the REE so that write access is deactivated by the TEE manager.

An electronic device according to various embodiments of the disclosure may write data to a shared memory through a normal application in a rich execution environment (REE) and may then change access permission of the shared memory to allow only a read access, so that it is possible to prevent an attacker having kernel permission from manipulating the data of the shared memory. Accordingly, security of the shared memory can be enhanced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart illustrating a memory protection method according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
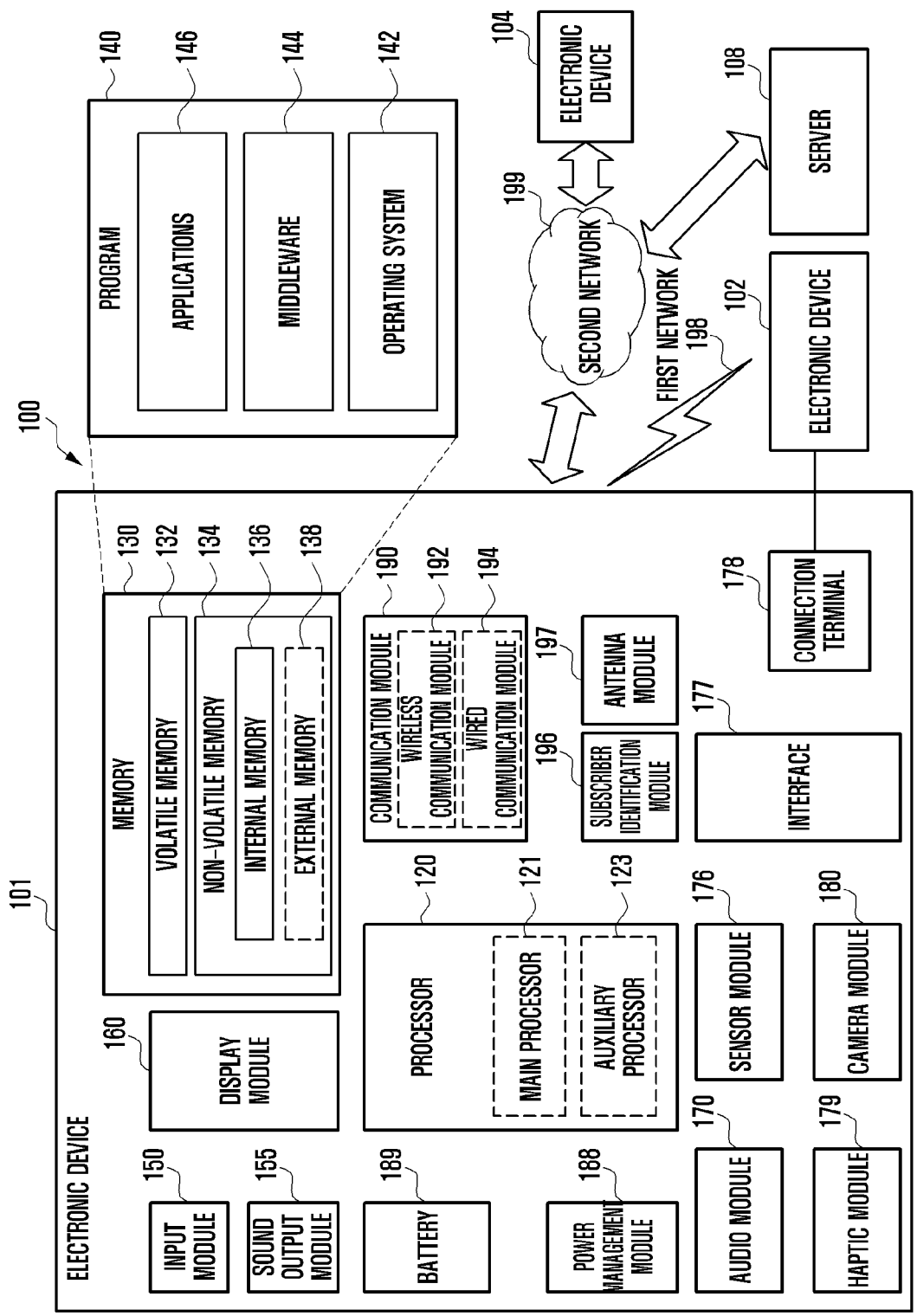
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., an mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
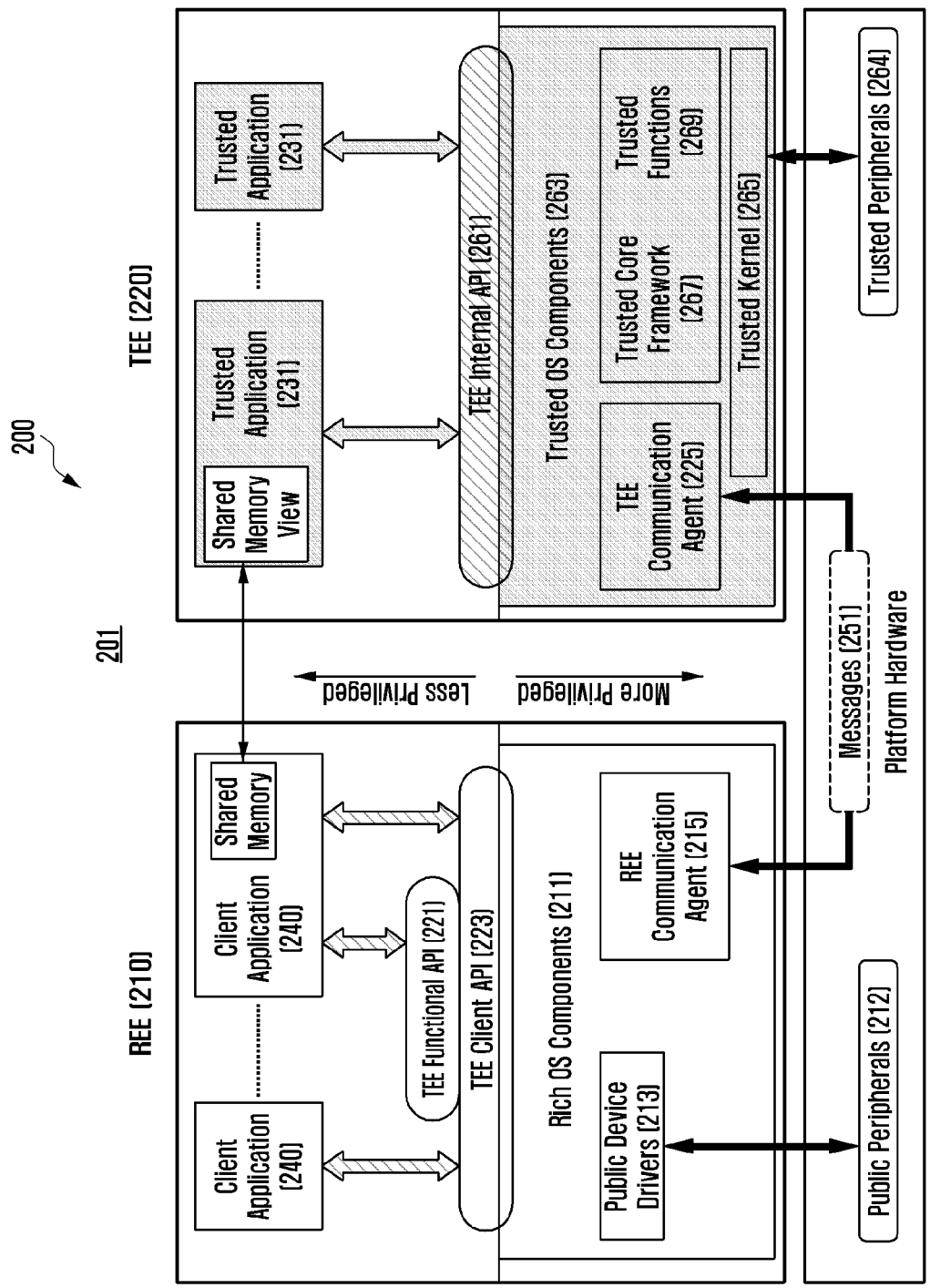
FIG. 2 is a block diagram illustrating a rich execution environment (REE) and a trusted execution environment (TEE) operated in an electronic device according to an embodiment of the disclosure.

FIG. 2 is a block diagram illustrating a rich execution environment (REE) and a trusted execution environment (TEE) 220 operated in an electronic device 201 according to an embodiment of the disclosure.

Referring to FIG. 2, in a diagram 200, according to various embodiments, the electronic device 201 (e.g., the electronic device 101) may operate a plurality of execution environments having a plurality of security levels to enhance security. The plurality of execution environments includes, for example, a REE 210 and a TEE 220. The REE 210 is, for example, a first execution environment having a first security level. The TEE 220 is, for example, a second execution environment having a second security level different (e.g., higher) from the first security level. According to an embodiment, the electronic device 201 may include another execution environment (e.g., a third execution environment) having a third security level, but is not limited thereto.

The TEE 220 may store data requiring a relatively high security level in a secure environment and perform related operations. The TEE 220 may operate on an application processor (AP) (e.g., the main processor 121 of FIG. 1) of the electronic device 201, and may operate based on a reliable hardware structure determined during a process of manufacturing the electronic device 201. The TEE 220 may divide the AP or a memory (e.g., the memory 130 of FIG. 1) into a normal world (or a normal environment) and a secure world (or a secure environment) to operate in the secure world. The TEE 220 may be configured to operate software or hardware that requires security only in the secure world. The electronic device 201 may operate the TEE 220 through a physical change of hardware or a logical change of software.

The TEE 220 and the REE 210 may be separated from each other through hardware restrictions, and may be separated from each other in a software manner in the same hardware to operate. At least one application (client application, CA) 240 (e.g., payment, contact, e-mail, or browser) operating in the REE 210 may use an application programming interface (API) (e.g., TEE functional API 221 or a TEE client API 223) that is allowed to access the TEE 220. The at least one application 240 operating in the REE 210 may use the API (e.g., 221 or 223) to transmit messages 251 from a REE communication agent 215 to a TEE communication agent 225. The messages 251 may be implemented to be transmitted only to the TEE 220 in a hardware or software manner. The REE 210 may include an operating system (e.g., rich OS components 211), and may operate public device drivers 213 for controlling public peripherals 212.

The TEE communication agent 225 may receive the messages 251 and may transmit the messages 251 to a trusted application (TA) 231 (e.g., digital right management (DRM), secure payment module, or secure biometric information module) related to the messages 251. The TA 231 may perform an operation related to the messages 251 and may transmit a result of the operation to the REE communication agent 215 through the TEE communication agent 225. The REE communication agent 215 may transmit the result to the at least one application 240 operating in the REE 210. The TEE 220 may include trusted OS components 263 that operate TAs 231 based on a TEE internal API 261. The trusted OS components 263 may include a trusted kernel 265 and a trusted core framework 267 for controlling trusted peripherals 264, and/or trusted functions 269.

Hereinafter, according to various embodiments, description will be made based on the fact that the REE 210 is defined as a normal environment and the TEE 220 is defined as a secure environment.

Figure 3:
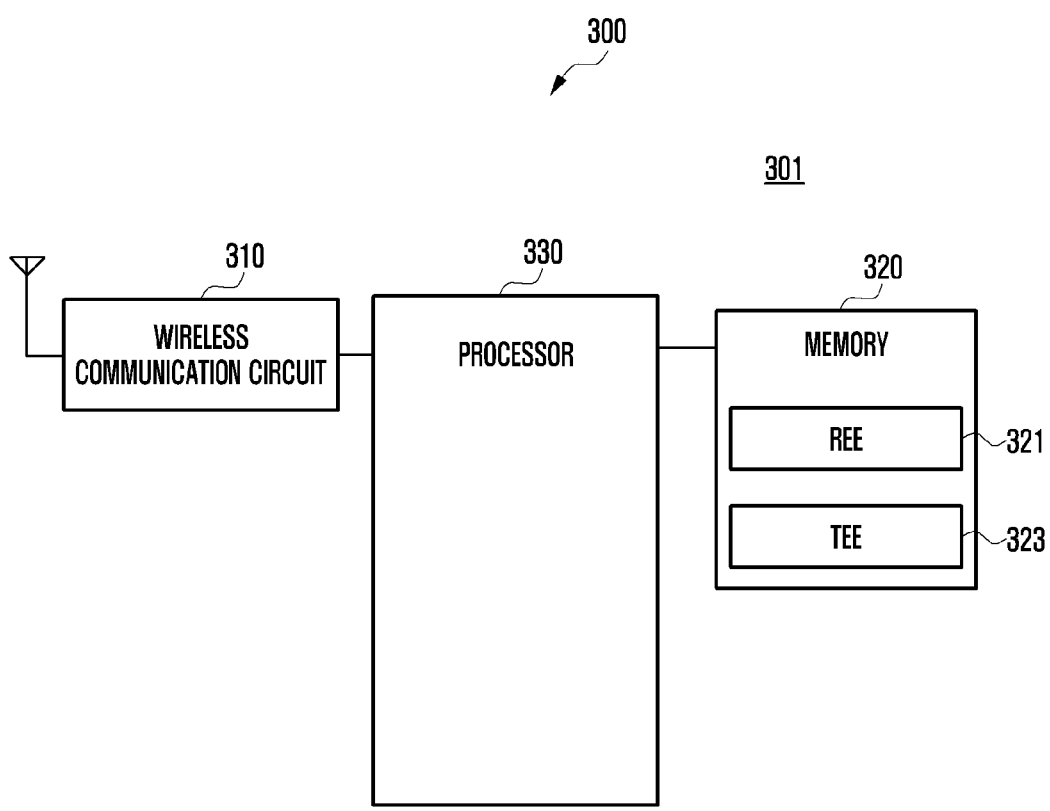
FIG. 3 is a block diagram illustrating an electronic device according to an embodiment of the disclosure.

FIG. 3 is a block diagram illustrating an electronic device according to an embodiment of the disclosure.

Referring to FIG. 3, in a diagram the electronic device 301 (e.g., the electronic device 101 of FIG. 1 and the electronic device 201 of FIG. 2) may include a wireless communication circuit 310 (e.g., the communication module 190 of FIG. 1), a memory 320 (e.g., the memory 130 of FIG. 1), and/or a processor 330 (e.g., the processor 120 of FIG. 1).

According to various embodiments of the disclosure, the wireless communication circuit 310 (e.g., the communication module 190 of FIG. 1) may establish a communication channel with an external electronic device (e.g., the electronic devices 102 and 104, and the server 108 of FIG. 1), and may support transmission and reception of various data to and from the external electronic device.

In an embodiment, the wireless communication circuit 310 may download a client application from an application providing server under the control of the processor 330 and perform an authentication operation by receiving a public key through a trusted authentication server.

According to various embodiments of the disclosure, the memory 320 (e.g., the memory 130 of FIG. 1) may include a rich execution environment (REE) 321 (e.g., the REE 210 of FIG. 2) (hereinafter also referred to as "normal environment") and a TEE 323 (e.g., the TEE 220 of FIG. 2) (hereinafter also referred to as "secure environment").

In an embodiment, the TEE 323 may include a trusted system associated with electronic device 301. For example, the electronic device 301 uses the TEE 323 to protect information included in or stored in the TEE 323 from control related to an external request, modification, or input. In another embodiment, the TEE 323 may execute a trusted application or manage encrypted information.

In another embodiment, the REE 321 may include an application layer and, unlike the TEE 323, may allow external access and/or control.

Various embodiments will be described in FIGS. 4 and 5 to be described later with respect to the above-described REE 321 and TEE 323.

According to various embodiments of the disclosure, the processor 330 (e.g., the processor 120 of FIG. 1) may control the overall operation of the electronic device 301 and a signal flow between internal components of the electronic device 301, and may perform data processing.

In another embodiment, the processor 330 may allocate a first address space and a second address space to the memory 320 based on detecting a request to write data. The processor 330 may map the first address space and the second address space of the memory 320 to a first user virtual memory address space and a second user virtual memory address space of a first page table of the REE 321. The processor 330 may map the first address space and the second address space of the memory 320 to a first kernel virtual memory address space and a second kernel virtual memory address space of a second page table of the REE 321.

In another embodiment, the processor 330 may transmit virtual memory addresses of the first address space and the second address space of the memory 320 and caller information (e.g., memory space information of the processor) managed by the kernel to a manager of the TEE 323.

In another embodiment, the processor 330 may generate a first hash value for each page unit for a static region of a client application (e.g., the client application 240 of FIG. 2). The processor 330 may compare the first hash value with a previously stored second hash value (e.g., a second hash value generated during compilation) for the virtual memory address of the static region of the client application 240, and may perform, based on the comparison result, first caller authentication for a loaded page in the static region of the client application 441 that determines whether the first hash value and the second hash value are the same. The client application 441 includes a shared memory pointer 443 and a static region 445.

In another embodiment, when the first hash value and the second hash value are determined to be the same, the processor 330 may determine that the first caller authentication has been successfully performed, and may configure the access permission to the second user virtual memory address space, mapped to the second address space in the memory 320, so that read access and write access are deactivated.

In another embodiment, the processor 330 may write data to the first address space of the memory 320 and then detect reading into the second address space. The processor 330 configures the access permission of the second address space so that read access and write access are deactivated, but a reading permission fault may occur as the read access is detected. Based on this, whether the reading permission fault occurs in the second address space of the memory 320. Based on the determination that the reading permission fault has occurred in the second address space of the memory 320, the processor 330 may perform second caller authentication that verifies the loaded page of the static region (e.g., the static region of the client application 240) where the first caller authentication has not been performed. When it is determined that the second caller authentication has been successfully performed, the processor 330 may configure the access permission of the first user virtual memory address space and the second user virtual memory address space so that read access is activated and write access is deactivated.

Figure 4:
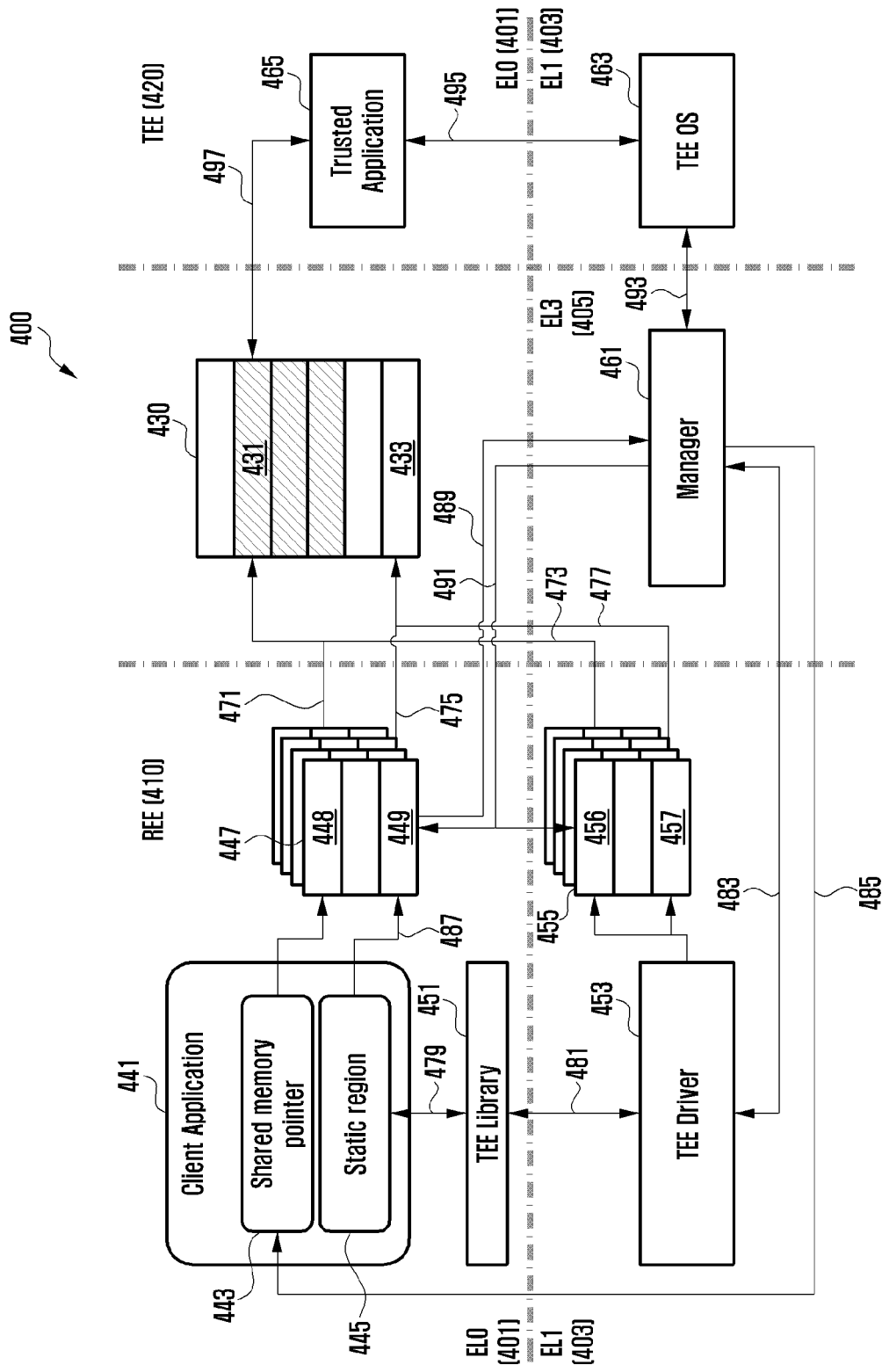
FIG. 4 is a diagram illustrating a signal flow between a REE and a TEE operated in an electronic device according to an embodiment of the disclosure.

FIG. 4 is a diagram illustrating a signal flow between a REE and a TEE=operated in an electronic device according to an embodiment of the disclosure.

Referring to FIG. 4, in a diagram 400, the REE 410 (e.g., the REE 321 of FIG. 3) (hereinafter also referred to as "normal environment") and the TEE 420 (e.g., the TEE 323 of FIG. 3) (hereinafter also referred to as "secure environment") according to various embodiments of the disclosure may be divided into a plurality of exception levels. The plurality of exception levels may include a first exception level (e.g., EL0 401), a second exception level (e.g., EL1 403), a third exception level EL2 (not shown), and a fourth exception level (e.g., EL3 405).

In an embodiment, the first exception level EL0 401 of the REE 410 and TEE 420 may include a user space. The user space may drive an application (e.g., the client application 441).

In another embodiment, the second exception level EL1 403 of the REE 410 and TEE 420 may include a kernel space. The kernel space may control or manage system resources used to execute operations or functions implemented in other programs. The kernel space may provide an interface capable of controlling or managing system resources by accessing individual components of an electronic device (e.g., the electronic device 301 of FIG. 3) in middleware, an API, or an application program.

In another embodiment, the fourth exception level (EL3 405) of the TEE 420 may include a secure space. For example, the secure space is a secure monitor space, and serves as an interface supporting switching between the address spaces of the REE 410 and the TEE 420. For example, the secure space is a space executing TrustZone technology of Advance RISC Machine (ARM).

In the REE 410 according to various embodiments, the first exception level EL0 401 may include a client application (CA) 441 and a TEE library 451. The client application 441 may include an embedded application and a 3rd party application. For example, the embedded application includes a web browser, an email program, and an instant messenger. It is possible to store data required to execute the CA 441 and data received from an external electronic device (e.g., the electronic device 102 or 104, or the server 108 of FIG. 1) through a wireless communication circuit (e.g., the wireless communication circuit 310 of FIG. 3).

In the REE 410 according to various embodiments, the second exception level EL1 403 may include a TEE driver 453. The TEE driver 453 may transmit data stored in the kernel space to a manager 461 of the TEE 420.

In the TEE 420 according to various embodiments, the first exception level EL0 401 may include a trusted application (TA) 465. The TA 465 may include applications necessary for the operation of the TEE 420 or TAs which are called for security authentication and authorization in processes requiring security, such as integrity verification and attestation of kernel data.

In the TEE 420 according to various embodiments, the second exception level EL1 403 may include a TEE OS 463. The TEE OS 463 may include an operating system to which security technology is applied.

In the TEE 420 according to various embodiments, the fourth exception level EL3 405 may include the manager 461. The manager 461 may load the data of the REE 410 received from the REE 410 to the address space (e.g., a table included in the fourth exception level (e.g., EL3 405) managed by the manager 461) of the TEE 420.

In another embodiment, based on detecting a request to write data to the memory 430, the CA 441 of the REE 410 may allocate a first address space 431 and a second address space 433 in the memory 430.

In another embodiment, the first address space 431 of the memory 430 may include an address space shared between a REE (e.g., the REE 410 of FIG. 4) and a TEE (e.g., the TEE 420 of FIG. 4). For example, the first address space 431 is used to transmit data between the REE 410 and the TEE 420. The second address space 433 of the memory 430 may include an address space allocated to be switched to a secure space (e.g., the secure space of the fourth exception level EL3 405) of the TEE 420 while minimizing the intervention of the kernel (e.g., the second exception level (EL1 403) of the REE 410) of the REE 410.

In another embodiment, the kernel, which is the second exception level EL1 403 of the REE 410, may manage a user space (e.g., the first exception level EL0 401 of the REE 410) and a page table (e.g., a first page table 447 or a second page table 455) of a kernel space.

In another embodiment, the electronic device 301 (e.g., the kernel space (e.g., the second exception level EL1 403 of the REE 410)) may map, in 471 and 475, the first address space 431 and the second address space 433 of the memory 430 to a first user virtual memory address space 448 and a second user virtual memory address space 449 of the first page table 447 of the user space (e.g., the first exception level EL0 401) in the REE 410. The access permission of the first user virtual memory address space 448 of the first page table 447 and the access permission of the second user virtual memory address space 449 may be configured (e.g., read and write (RW)) so that read access and write access may be activated (read-writable).

In another embodiment, the electronic device 301 (e.g., the kernel space (e.g., the second exception level EL1 403)) may map, in 473 and 477, the first address space 431 and the second address space 433 of the memory 430 to a first kernel virtual memory address space 456 and a second kernel virtual memory address space 457 of a second page table 455 of the kernel space in the REE 410. The access permission of the first kernel virtual memory address space 456 of the second page table 455 and the access permission of the second kernel virtual memory address space 457 may be configured (e.g., read and write (RW)) so that read access and write access may be activated.

In another embodiment, the CA 441 may call, in 479, an application programming interface (API) (e.g., the TEE functional API 221 or the TEE client API 223 of FIG. 2) to transmit data to the TEE library 451. The TEE library 451 may use the added API to transmit, in 481, the virtual memory addresses of the first address space 431 and the second address space 433 of the memory 430 to the TEE driver 453. The TEE driver 453 of the kernel space (e.g., the second exception level EL1 403 of the REE 410) may transmit, in 483, the virtual memory addresses of the first address space 431 and the second address space 433 and caller information (e.g., memory space information in the process) managed by the kernel space to the manager 461 (e.g., the fourth exception level EL3 405) of the TEE 420.

In another embodiment, the manager 461 may use a cryptographic hash to generate a first hash value for each page unit for a static region of the CA 441, based on the caller information (e.g., the memory space information in the process) managed by the kernel space. The manager 461 may compare the first hash value and a previously stored second hash value (e.g., a second hash value generated during compilation) for the virtual memory address of the static region of the CA 441. The manager 461 may perform first caller authentication, that is, perform authentication on a loaded page of the static region of the CA 441 based on whether the first hash value and the second hash value are the same through the comparison. For example, the performing of the first caller authentication is an operation for determining whether the CA 441 requesting to write data is appropriate.

In another embodiment, when it is determined that the generated first hash value for the static region of the CA 441 and the previously stored second hash value for the virtual memory address of the static region of the client application 441 are the same, the manager 461 may determine that the first caller authentication has been successfully performed, and may store the virtual memory addresses of the first address space 431 and the second address space 433 in the table (e.g., the table included in the fourth exception level (e.g., EL3 405), managed by the manager 461) of the TEE 420. For example, the electronic device 301 provides a translation table base register (TTBR) that is a register including an address space for searching information stored in the memory 430. When the first caller authentication has been successfully performed, the manager 461 may store the virtual memory addresses of the first address space 431 and the second address space 433 in the table of the TEE 420 (e.g., the fourth exception level (e.g., EL3 405)) by using "TTBR0_EL1" as an identifier.

In another embodiment, when the first caller authentication has been successfully performed, the manager 461 may configure the access permission of the second user virtual memory address space 449 mapped to the second address space 433 of the memory 430 so that access is deactivated (e.g., configure the same so that read access and write access are deactivated). For example, switching from a state in which read access and write access, which are the access permission of the second user virtual memory address space 449 of the first page table 447, is activated (e.g., a state configured as read and write (RW)) to a state in which the read access and write access are deactivated (e.g., no access (NA) may be performed.

In another embodiment, when the first caller authentication has been successfully performed, the electronic device 301 may configure a value indicating that the first caller authentication has been performed. For example, a value for whether the first caller authentication has been performed is configured using a specific bit of a page descriptor of the memory 430. As the value for whether the first caller authentication has been performed may be configured using a specific bit of the page descriptor, second caller authentication which will be described later may not be performed on the address space of the memory in which the first caller authentication has been performed.

According to various embodiments, an example in which first caller authentication is performed based on whether the generated first hash value for the static region of the CA 441 and the previously stored second hash value for the virtual memory address of the static region of the CA 441 are the same has been described, but the disclosure is not limited thereto. For example, the manager 461 performs first caller authentication using control flow integrity (CFI). For another example, the manager 461 determines whether the generated first hash value for the static region of the CA 441 and the previously stored second hash value for the virtual memory address of the static region of the CA 441 are the same, and may then perform first caller authentication that additionally verifies control flow integrity (CFI).

In various embodiments, as the first caller authentication is performed, hash calculation may be performed on some pages (e.g., loaded pages), and verification may be performed only on added pages (e.g., loaded pages on which first caller authentication has not been performed) in second caller authentication which will be described later, so that system overhead may be lowered.

In another embodiment, in a state (e.g., a state in which read access and write access are deactivated (no access, NA)) in which access to the second user virtual memory address space 449 of the first page table 447 is changed to be deactivated, the CA 441 may write data to the first address space 431 of the memory 430, and may then read the second address space 433.

In another embodiment, as the access permission of the second user virtual memory address space 449 is configured so that read access and write access are deactivated, the read access and write access for the access permission of the mapped second address space 433 may be also in the deactivated state. Alternatively, as the CA 441 reads the second address space 433, a reading permission fault may occur in 489. As the reading permission fault occurs, the electronic device 301 may execute an exception handler (not shown), and may execute the manager 461 included in the fourth exception level EL3 405 of the TEE 420 through a secure monitor call (SMC) for the reading permission fault.

In another embodiment, the manager 461 may determine whether the reading permission fault has occurred in the second address space 433. For example, the manager 461 identifies system registers (e.g., TTBR0_EL1, FAR (fault address register)_EL1, ELR(exception link register)_EL1). For example, TTBR refers to a translation table address referred to when the virtual memory address is converted into a physical address. A fault address register (FAR)_EL1 may include the address of the second address space 433 of the memory 430 at the time when the reading permission fault occurs in the second address space 433. An exception link register (ELR) may include an address to return to after terminating exception. For example, ELR_EL1 refers to a register that can identify an instruction location (e.g., an address space) that caused the reading permission fault.

In another embodiment, the manager 461 may determine whether the reading permission fault has occurred by the second address space 433 of the memory 430 based on the determined system registers (e.g., TTBR0_EL1, FAR_EL1, ELR_EL1). For example, the manager 461 reads the system registers (e.g., TTBR0_EL1, FAR_EL1, ELR_EL1) to identify the CA 441 that causes the occurrence of the reading permission fault and the address space in which the reading permission fault has occurred. Based on the determination that the reading permission fault has occurred in the second address space 433 of the memory 430, the manager 461 may perform, in 485, second caller authentication.

In another embodiment, the manager 461 may identify a value of whether to perform first caller authentication, configured in a specific bit of a page descriptor of the memory 430. The manager 461 may identify the value of whether to perform the first caller authentication, configured in the specific bit of the page descriptor, and may perform second caller authentication on the loaded page of the static region (e.g., the static region of the CA 441) in which first caller authentication has not performed. For example, the manager 461 generates (calculates) a third hash value for the loaded page of the static region (e.g., the static region of the CA 441) in which first caller authentication has not been performed. The manager 461 may compare the third hash value with the previously stored second hash value for the virtual memory address of the static region of the CA 441, and may perform second caller authentication on the static region that determines whether the third hash value and the second hash value are the same based on the comparison result.

According to various embodiments, an example in which second caller authentication has been performed based on whether the generated third hash value for the loaded page of the static region (e.g., the static region of the CA 441) in which first caller authentication has not been performed and the previously stored second hash value of the virtual memory address of the static region of the CA 441 are the same has been described, but the disclosure is not limited thereto. For example, the manager 461 performs second caller authentication using control flow integrity (CFI). For another example, the manager 461 determines whether the generated third hash value and the second hash value are the same, and may then perform second caller authentication that additionally verifies CFI.

In another embodiment, when it is determined that the generated third hash value and the previously stored second hash value are the same, the manager 461 may determine that second caller authentication has been successfully performed, and may configure, in 491, the access permission of the first user virtual memory address space 448, the second user virtual memory address space 449, and the first kernel virtual memory address space 456 so that read access is activated and write access is deactivated.

In another embodiment, as read access and write access for the access permission of the second address space 433 have been configured to be in the deactivated state and thus the reading permission fault has occurred, reading to the second address space 433 was held. However, as read access is configured to be activated for the second address space 433, the CA 441 may read, in 487, a value stored in the second address space 433. Accordingly, the trusted application 465 may be called.

In another embodiment, the manager 461 may identify the table of the TEE 420 (e.g., the fourth exception level EL3 405) and the access permission of the first address space 431 when the trusted application 465 is called. When TTBR0_EL1 is registered in the table of the TEE 420, and read access is configured to be activated and write access is configured to be deactivated for the access permission of the first address space 431, the manager 461 may transmit, in 493, the virtual memory address of the first address space 431 of the memory 430 to the TEE OS 463, and may call, in 495, the trusted application 465. The trusted application 465 may read, in 497, data of the first address space 431 of the memory 430 with reference to the virtual memory address of the first address space 431.

In another embodiment, when TTBR0_EL1 is not registered in the table of the TEE 420 and/or write access is configured to be activated for the access permission of the first address space 431, the manager 461 may block the call of the trusted application 465. Only the CA 441 permitted by the above-described operation may call the trusted application 465, and thus, the security of the memory 430 may be enhanced.

In another embodiment, the CA 441 may transit a request to restore the access permission to the manager 461 through the API of the TEE library 479. When TTBR0_EL1 is registered in the table of the TEE 420, the manager 461 may change the access permission of the first address space 431 and the second address space 433 so that read access and write access are activated. The manager 461 may delete the virtual memory addresses of the first address space 431 and the second address space 433 of the memory 430 registered as TTBR0_EL1 in the table of the TEE 420. When the access permission of the first address space 431 and the second address space 433 is changed so that read access and write access are activated, the CA 441 may release allocation of the first address space 431 and the second address space 433 of the memory 430.

Figure 5:
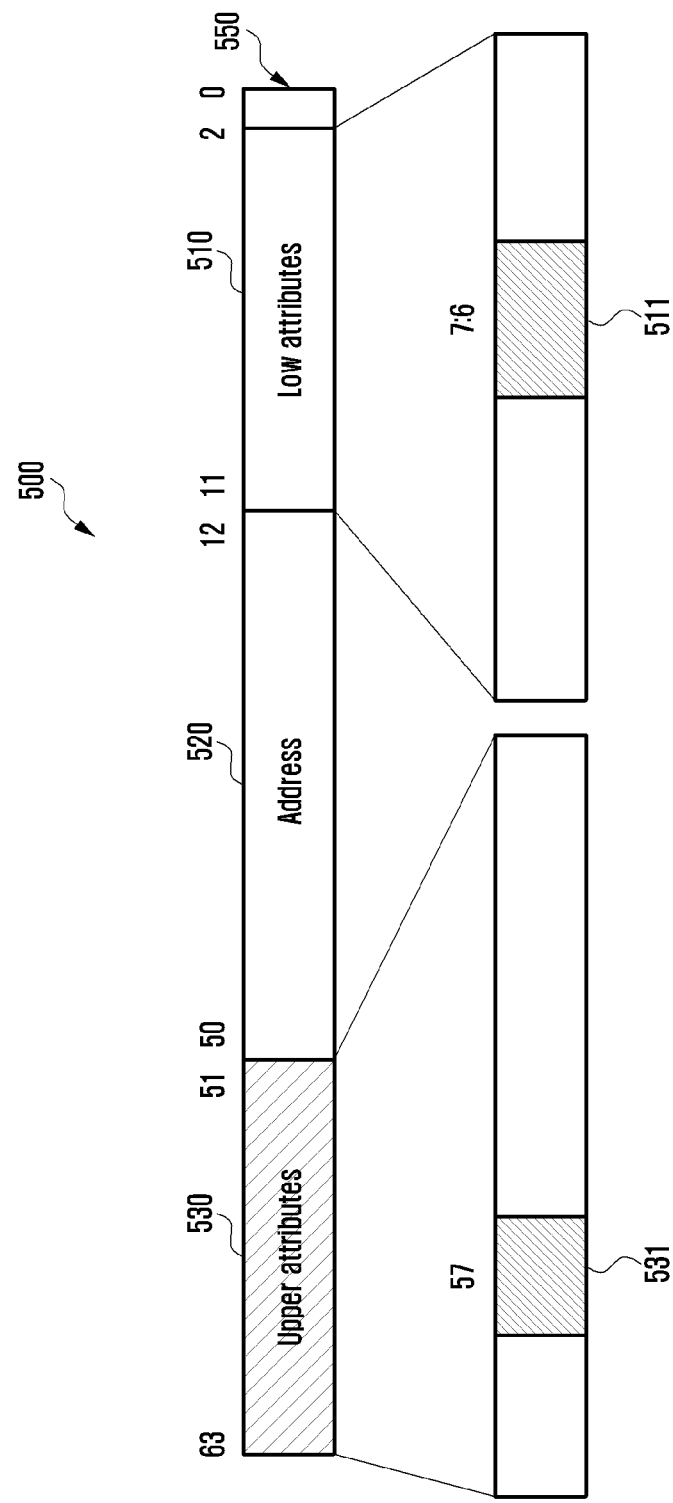
FIG. 5 is a diagram illustrating a page descriptor according to an embodiment of the disclosure.

FIG. 5 is a diagram illustrating a page descriptor according to an embodiment of the disclosure.

Referring to FIG. 5, in a diagram 500, a page descriptor 550 for a memory (e.g., the memory 430 of FIG. 4) is illustrated. The page descriptor 550 may have a size of 64 bits, but is not limited thereto.

In an embodiment, the page descriptor 550 may be divided into a plurality of regions based on 64 bits. For example, the page descriptor 550 is divided into a lower attribute region 510 (e.g., from 2nd bit to 11th bit), an address region 520 (e.g., 12th bit to 50th bit, an area where address information for accessing the memory 430 is stored), and an upper attribute region 530 (e.g., from 51st bit to 63rd bit).

The size for each of the lower attribute region 510 (e.g., from 2nd bit to 11th bit), the address region 520 (e.g., 12th bit to 50th bit), and the upper attribute region 530 (e.g., from 51st bit to 63rd bit) constituting the above-described page descriptor 550 according to various embodiments is an example, but the disclosure is not limited thereto.

In another embodiment, the electronic device 301 (e.g., the electronic device 301 of FIG. 3) may store bit information in an access permission region 511 in which access permission (AP) of the lower attribute region 510 can be configured. For example, the access permission region 511 of the lower attribute region 510 is represented by the 6th bit and the 7th bit. For example, an unprivileged level includes EL0 (e.g., the first exception level in FIG. 4 (e.g., EL0 401)), and a privileged level may include EL1 (e.g., the second exception level (e.g., EL1 403)), EL2 (e.g., the third exception level (not shown)), and EL3 (e.g., the fourth exception level of FIG. 4 (e.g., EL3 405)). The 7th bit may indicate the access permission of the privileged level (e.g. EL1 403, EL2, and EL3 405), and the 6th bit may indicate the access permission of the unprivileged level (e.g. EL0 401). The electronic device 301 may use the access permission region 511 to configure the access permission of the memory 430 as shown in Table 1 below.

TABLE 1

| Access permission | Unprivileged level (EL0) | privileged level (EL1/2/3) |
| --- | --- | --- |
| 00 | Deactivate read and write access (no access, NA) | Activate read and write access (read and write, RW) |
| 01 | Activate read and write access (read and write, RW) | Activate read and write access (read and write, RW) |
| 10 | Deactivate read and write access (no access, NA) | Activate only read access (read-only, RO) |
| 11 | Activate only read access (read-only, RO) | Activate only read access (read-only, RO) |

In various embodiments, Table 2 below shows access permission for virtual address spaces (e.g., the first user virtual memory address space 448, the second user virtual memory address space 449, the first kernel virtual memory address space 456, and the second kernel virtual memory address space 457) of a first page table (e.g., the first page table 447 of FIG. 4) and a second page table (e.g., the second page table 455 of FIG. 4) mapped to a first address space (e.g., the first address space 431 of FIG. 4) and a second address space (e.g., the second address space 433 of FIG. 4) of a memory (e.g., the memory 430 of FIG. 4). Since the first address space 431 and the second address space 433 of the memory 430 are double-mapped to the first and second user virtual memory address spaces 448 and 499 of the first page table 447 and the first and second kernel virtual memory address spaces 456 and 457 of the second page table 455, the access permission for the user virtual address space and the kernel virtual address space may be changed.

For example, when the first and second address spaces 431 and 433 of the memory 430 are mapped to the first and second user virtual memory address spaces 448 and 449 of the first page table 447 (e.g., EL0 401), the electronic device 301 configures bits of the access permission of the first user virtual memory address space 448 and the access permission of the second user virtual memory address space 449 to be "01(RW)". When the first and second address spaces 431 and 433 of the memory 430 are mapped to the first and second kernel virtual memory address spaces 456 and 457 of the second page table 455 (e.g., EL1 403), the electronic device 301 may configure bits of the access permission of the first kernel virtual memory address space 456 and bits of the access permission of the second kernel virtual memory address space 457 to be "00(RW)".

The above-described configuring of the bits of the access permission of the first and second user virtual memory address spaces 448 and 449 of the first page table 447 (e.g., the first page table 447 of EL0 401) to be "01(RW)" and the configuring of the bits of the access permission of the first and second kernel virtual memory address spaces 456 and 457 of the second page table 455 (e.g., EL1 403) to be "00(RW)" may be, for example, an allocation step.

For another example, after first caller authentication is performed, the electronic device 301 may configure the bits of the access permission of the first user virtual memory address space 448 to be "01(RW)", the bits of the access permission of the second user virtual memory address space 449 to be "10(NA)", and the bits of the access permission of the first kernel virtual memory address space 456 to be "00(RW)". In other words, after first caller authentication is performed, the electronic device 301 may change only the access permission of the second user virtual memory address space 449 from "01(RW)" to "10(NA)".

In the above-described electronic device 301, changing the bits of the access permission of the second user virtual memory address space 449 from "01 (RW)" to "10 (NA)" may be defined as, for example, an initialization step.

For another example, the electronic device 301 performs second caller authentication based on the occurrence of the reading permission fault in the second address space 433, so that the bits of the access permission of the first user virtual memory address space 448 may be configured to be "11 (RO)", the bits of the access permission of the second user virtual memory address space 449 may be configured to be "11(RO)", and the bits of the access permission of the first kernel virtual memory address space 456 may be configured to be "11(RO)". By configuring the bits to be "11", in the access permission for all exception levels (e.g., the first exception level (EL0), the second exception level (EL1), the third exception level (EL2), and the fourth exception level (EL3)), only the read access may be activated, so that even if an attacker has kernel permission, he or she cannot modify or delete data.

The above-described configuring of the bits of the access permission of the first user virtual memory address space 448, the second user virtual memory address space 449, and the first kernel virtual memory address space 456 to be "11(RO)" may be defined as an operation step.

TABLE 2

| Memory | | Allocation step | Initialization step | Operation step |
|---|---|---|---|---|
| First address space | First user virtual address space | 01(RW) | 01(RW) | 11(RO) |
| | First kernel virtual address space | 00(RW) | 00(RW) | 11(RO) |
| Second address space | Second user virtual address space | 01(RW) | 10(NA) | 11(RO) |
| | Second kernel virtual address space | 00(RW), 01(RW), 10(RO), or, 11(RO) | 00(RW), 01(RW), 10(RO), or, 11(RO) | 00(RW), 01(RW), 10(RO), or, 11(RO) |

In various embodiments, the features of configuring the access permission by using the 6th bit and the 7th bit according to the above-described Table 1 and Table 2 and the bit values of the access permission in the allocation step, the initialization step, and the operation step according to the virtual address space belong to just an embodiment, and the disclosure is not limited to Table 1 and Table 2. For example, the bit values of the access permission in the allocation step, the initialization step, and the operation step according to the bits capable of configuring the access permission and the virtual address space may vary depending on the type of ARM architecture.

In another embodiment, the electronic device 301 may store bit information in a partial region of the upper attribute region 530. For example, a value indicating whether to perform first caller authentication may be configured using a region 531 represented by the 57th bit in the upper attribute region 530. When second caller authentication is performed, based on a value indicating whether to perform first caller authentication configured in the 57th bit of the upper attribute region 530, second caller authentication may not be performed on the address space of the memory in which first caller authentication has been performed. For example, the 57th bit of the upper attribute region 530 may be an unused bit (e.g., unused bit) in the page descriptor 550.

In various embodiments, the defining of the unused bit as the 57th bit of the upper attribute region 530 is another embodiment, but is not limited thereto. For example, the unused bits in the page descriptor 550 may vary depending on the type of ARM architecture.

FIG. 6 is a flowchart illustrating a memory protection method according to an embodiment of the disclosure.

Referring to FIG. 6, in a method 600, in operation 605, an electronic device (e.g., the electronic device 301 of FIG. 3) (e.g., the client application 441 of FIG. 4) may allocate a first address space (e.g., the first address space 431 of FIG. 4) and a second address space (e.g., the second address space 433 of FIG. 4) to a memory (e.g., the memory 430 of FIG. 4) based on detecting a request to write data.

In an embodiment, the first address space 431 of the memory 430 is an address space shared between a REE (e.g., the REE 410 of FIG. 4) and a TEE (e.g., the TEE 420 of FIG. 4), and may be used to transmit data between the REE 410 and the TEE 420. The first address space 431 may include an address space allocated to switch to a secure space (e.g., the secure space of the fourth exception level EL3 405) of the TEE 420 while minimizing the intervention of the REE 410 of the second address space 433 of the memory 430.

In another embodiment, in operation 610, the electronic device 301 (e.g., the kernel space (e.g., the second exception level EL1 403 of the REE 410)) may map the first address space 431 and the second address space 433 of the memory 430 to the first user virtual memory address space 448 and the second user virtual memory address space 449 of the first page table (e.g., the first page table 447 of FIG. 4) of the REE 410. In another embodiment, the electronic device 301 may configure the access permission of the first user virtual memory address space 448 and the access permission of the second user virtual memory address space 449 of the first page table 447 so that read access and write access are activated (e.g., read and write (RW)).

In another embodiment, in operation 615, the electronic device 301 (e.g., the kernel space (e.g., the second exception level EL1 403 of the REE 410)) may map the first address space 431 and the second address space 433 of the memory 430 to the first kernel virtual memory address space 456 and the second kernel virtual memory address space 457 of the second page table (e.g., the second page table 455 of FIG. 4) of the REE 410. In another embodiment, the electronic device 301 may configure the access permission of the first kernel virtual memory address space 456 and the access permission of the second kernel virtual memory address space 457 of the second page table 455 so that read access and write access are activated (e.g., read and write (RW)).

According to various embodiments, operations 610 and 615 may be performed substantially simultaneously.

In another embodiment, the electronic device 301 (e.g., the client application 441) may use an API added to a TEE library (e.g., the TEE library 451 of FIG. 4) to transmit the virtual memory address of the first address space 431 and the second address space 433 of the memory 430 to a TEE driver (e.g., the TEE driver 453 of FIG. 4). The TEE driver 453 may transmit the virtual memory addresses of the first address space 431 and the second address space 433 and caller information (e.g., memory space information in the process) managed by a kernel (e.g., the EL1 403 of FIG. 4) to a manager (e.g., the manager 461 of FIG. 4) of the TEE 420.

In another embodiment, in operation 620, the electronic device 301 (e.g., the manager 461) may perform first caller authentication. For example, the electronic device 301 (e.g., the manager 461) uses a cryptographic hash to generate a first hash value for each page unit for a static region (e.g., the static region 445 of FIG. 4) of a caller process, for example, the client application 441. The electronic device 301 (e.g., the manager 461) may pre-store the second hash value generated during compilation, may compare the first hash value with the pre-stored second hash value, and based on the comparison result, may perform first caller authentication on a loaded page of the static region of the client application 441 that determines whether the first hash value and the second hash value are the same. The second hash value generated during compilation may be statically transmitted (e.g., transmitted during compilation) or dynamically transmitted (e.g., transmitted during booting) to the manager 461 of the TEE 420.

In another embodiment, when it is determined that the first hash value and the second hash value are the same, the electronic device 301 (e.g., the manager 461) may determine that first caller authentication has been successfully performed, and may store the virtual memory addresses of the first address space 431 and the second address space 433 in the table of the TEE 420. The virtual memory addresses of the first address space 431 and the second address space 433 may be stored in the table of the TEE 420, and then the manager 461 may perform operation 625 which will be described later.

In another embodiment, in operation 625, the electronic device 301 (e.g., the manager 461) may configure read access and write access to the second user virtual memory address space 449 mapped to the second address space 433 of the memory 430 to be deactivated. For example, in operation 610, the electronic device 301 (e.g., the manager 461) changes a state (e.g., a state configured as RW) in which read access and write access, which are the access permission, of the second user virtual memory address space 449 of the configured first page table 447 are activated to a state (e.g., no access (NA)) in which the read access and write access thereof are deactivated.

In another embodiment, the electronic device 301 may include a translation lookaside buffer (TLB). The TLB may have address information of a recently converted page table. After the read access and write access of the access permission of the second user virtual memory address space 449 of the first page table 447 are changed to be deactivated (e.g., NA), the electronic device 301 may invalidate the TLB.

In another embodiment, in operation 630, the electronic device 301 (e.g., the client application 441) may write data to the first address space 431 of the memory 430, and may then detect reading into the second address space 433. For example, the electronic device 301 detects the reading into the second address space 433 before calling a trusted application (e.g., the trusted application 465 of FIG. 4).

In an embodiment, in operation 635, the electronic device 301 (e.g., the manager 461) may perform second caller authentication based on the occurrence of an error in the second address space 433. For example, the electronic device 301 configures the read access and write access for the access permission of the second address space 433 to be deactivated (e.g., operation 625), but causes a reading permission fault as the read access is detected. As the reading permission fault occurs, the electronic device 301 may execute an exception handler (not shown), and may execute the manager 461 included in the fourth exception level EL3 405 of the TEE 420 through a secure monitor call (SMC) for the reading permission fault.

The executed manager 461 may read system registers (e.g., TTBR0_EL1, FAR_EL1, and ELR_EL1) to identify the client application 441 that caused the reading permission fault and the address space where the reading permission fault occurred. Based on the determination that the reading permission fault has occurred in the second address space 433 of the memory 430, the electronic device 301 (e.g., the manager 461) may perform second caller authentication. For example, the electronic device 301 (e.g., the manager 461) identifies a value for whether to perform first caller authentication configured in a specific bit of a page descriptor of the memory 430, and may perform second caller authentication that verifies a loaded page of a static region (e.g., the static region of the client application 240) in which first caller authentication has not been performed. The electronic device 301 (e.g., the manager 461) may identify a value for whether to perform first caller authentication configured in a specific bit of the page descriptor of the memory 430, and may perform second caller authentication on the address space of the memory 430 in which first caller authentication has not been performed. For example, the electronic device 301 (e.g., the manager 461) generates (calculate) a third hash value for the static region for the virtual memory address of the address space of the memory 430 in which first caller authentication has not been performed. The electronic device 301 (e.g., the manager 461) may compare the third hash value with the previously stored second hash value of the virtual memory address of the static region of the client application 441, and based on the comparison result, may perform second caller authentication on the static region, which determines whether the third hash value and the second hash value are the same. For example, when the generated third hash value and the pre-stored second hash value are the same, the electronic device 301 (e.g., the manager 461) determines that the second caller authentication has been successfully performed.

In another embodiment, when second caller authentication has been successfully performed, in operation 640, the electronic device 301 (e.g., the manager 461) may configure (e.g., read-only (RO)) the access permission of the first user virtual memory address space 448 and the second user virtual memory address space 449 so that read access is activated and write access is deactivated. For example, the electronic device 301 uses the manager 461 of the TEE 420 to change the write access to be deactivated (e.g., RO) from the access permission in which the read and write of the first user virtual memory address space 448 of the first page table 447 of the REE 410, mapped to the first address space 431 of the memory 430, are activated (e.g., RW). The electronic device 301 may use the manager 461 of the TEE 420 to change the write access to be deactivated and the read access to be activated (RO) from a state in which the read access and write access are deactivated (e.g., NA) for the access permission of the second user virtual memory address space 449 of the first page table 447 of the REE 410, mapped to the second address space 433 of the memory 430.

In another embodiment, in operation 645, the electronic device 301 (e.g., the manager 461) may configure the access permission of the first kernel virtual memory address space 456 so that read access is activated and write access is deactivated. For example, the electronic device 301 uses the manager 461 of the TEE 420 to change the write access to be deactivated (RO) from the access permission in which the read and write of the first kernel virtual memory address space 456 of the second page table 455 in the REE 410, mapped to the first address space 431 of the memory 430, are activated (e.g., RW). In the access permission of the second kernel virtual memory address space 457 of the second page table 455 in the REE 410, mapped to the second address space 433 of the memory 430, the state (e.g., RW) in which the write and read are activated may be maintained.

Operations 640 and 645 according to various embodiments may be performed substantially simultaneously. After performing operations 640 and 645, the electronic device 301 may return to the first exception level EL0 401 of the REE 410, may access the second address space 433, and may read a value stored in the second address space 433.

In another embodiment, in operation 650, the electronic device 301 may identify the table of the TEE 420 and the access permission of the first address space 431 of the memory 430, and may call, in 495, the trusted application 465 when data and the virtual memory addresses of the first address space and the second address space are stored in the table of the TEE 420 (e.g., the data and the virtual memory addresses of the first address space and the second address space are registered in the table of the TEE 420 using TTBR0_EL1 as an identifier), and read access of the access permission of the first address space 431 is configured to be activated and write access thereof is configured to be deactivated.

In another embodiment, when the data and the virtual memory addresses of the first address space and the second address space are not stored in the table of the TEE 420 (e.g., the data and the virtual memory addresses of the first address space and the second address space are not registered in the table of the TEE 420 using TTBR0_EL1 as an identifier), and/or read access of the access permission of the first address space 431 is configured to be activated, the electronic device 301 may block the call of the trusted application 465.

According to various embodiments, although not shown, when a request to restore the access permission is detected, the electronic device 301 may change the access permission of the first address space 431 and the second address space 433 through the manager 461 so that read access and write access are activated, and may delete the virtual memory addresses of the first address space 431 and the second address space 433 from the table of the TEE 420. When the read access and write access for the access permission of the first address space 431 and the second address space 433 are changed to be activated, the electronic device 301 may release allocation of the first address space 431 and the second address space 433 of the memory 430.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a memory; and
   at least one processor configured to be operatively connected to the memory,
   wherein the memory stores instructions which, when executed by the at least one processor, cause the processor to:
      allocate a first address space and a second address space to the memory in a rich execution environment (REE) based on detecting a request to write data to the memory,
      write the data to the first address space of the memory and then detect access to the second address space in the REE,
      configure an access permission of a first user virtual memory address space, mapped to the first address space in the memory, in the REE so that write access is deactivated by a trusted execution environment (TEE) manager based on detecting the access to the second address space, and configure an access permission of a second user virtual memory address space, mapped to the second address space, in the REE so that read access is activated and write access is deactivated, and
      configure an access permission of a first kernel virtual memory address space, mapped to the first address space in the memory, in the REE so that write access is deactivated by the TEE manager.

2. The electronic device of claim 1, wherein the instructions, when executed by the at least one processor, further cause the at least one processor to:
   map, by a kernel of the REE, the first address space and the second address space of the memory to the first user virtual memory address space and the second user virtual memory address space of a first page table in the REE after allocating the first address space and the second address space, and
   map, by the kernel of the REE, the first address space and the second address space of the memory to the first kernel virtual memory address space and the second kernel virtual memory address space of a second page table in the REE.

3. The electronic device of claim 2, wherein the instructions, when executed by the at least one processor, further cause the at least one processor to:
   configure the access permission of the first user virtual memory address space, the access permission of the second user virtual memory address space, the access permission of the first kernel virtual memory address space, and the access permission of the second kernel virtual memory address space so that read access and write access are activated.

4. The electronic device of claim 3, wherein the instructions, when executed by the at least one processor, further cause the at least one processor to:
   transmit the data, virtual memory addresses of the first address space and the second address space, and memory space information of a process managed by the kernel to the TEE manager through a driver of the REE, after mapping the first address space and the second address space to the first kernel virtual memory address space and the second kernel virtual memory address space,
   generate, by the TEE manager, a first hash value for a static region of a client application in the REE based on the memory space information of the process,
   compare, by the TEE manager, the first hash value with a previously stored second hash value for virtual memory address of the static region, and
   perform, by the TEE manager, first caller authentication that verifies a loaded page of the static region based on whether the first hash value and the previously stored second hash value are equal to each other.

5. The electronic device of claim 4, wherein the instructions, when executed by the at least one processor, further cause the at least one processor to:
   determine, by the TEE manager, that the first caller authentication has been successfully performed in case that the first hash value and the previously stored second hash value are equal to each other, and store the data and the virtual memory addresses of the first address space and the second address space in a table of the TEE.

6. The electronic device of claim 5, wherein the instructions, when executed by the at least one processor, further cause the at least one processor to:
configure, by the TEE manager, a state in which the read access and the write access for the second user virtual memory address space in the REE, mapped to the second address space of the memory, are activated to be changed a state in which the read access and the write access are deactivated, after performing the first caller authentication.

7. The electronic device of claim 6, wherein the instructions, when executed by the at least one processor, further cause the at least one processor to:
configure a value indicating that the first caller authentication has been performed using a specific bit of a page descriptor of the memory after performing the first caller authentication.

8. The electronic device of claim 7, wherein the instructions, when executed by the at least one processor, further cause the at least one processor to:
allow an access permission fault to occur in the second address space based on detecting access to the second address space, by the client application in the state in which read access and write access for the access permission of the second user virtual memory address space, mapped to the second address space of the memory, are deactivated in the REE, and
call the TEE manager based on the occurrence of the access permission fault, and determine, by the TEE manager, whether the access permission fault has occurred in the second address space of the memory.

9. The electronic device of claim 8, wherein the instructions, when executed by the at least one processor, further cause the at least one processor to:
identify, by the TEE manager, the specific bit of the page descriptor based on determining that the access permission fault has occurred in the second address space of the memory, and
perform, by the TEE manager, second caller authentication that verifies the loaded page of the static region in which the first caller authentication has not been performed based on the specific bit.

10. The electronic device of claim 9, wherein the instructions, when executed by the at least one processor, further cause the at least one processor to:
generate, by the TEE manager, a third hash value for the loaded page of the static region in which the first caller authentication has not been performed,
compare, by the TEE manager, the previously stored second hash value for the virtual memory address of the static region and the generated third hash value, and
perform, by the TEE manager, the second caller authentication that verifies the loaded page of the static region in which the first caller authentication has not been performed, based on whether the previously stored second hash value and the third hash value are equal to each other.

11. The electronic device of claim 10, wherein the instructions, when executed by the at least one processor, further cause the at least one processor to:
determine, by the TEE manager, that the second caller authentication has been successfully performed in case that the previously stored second hash value and the third hash value are equal to each other, and change, in the state in which the read access and the write access for the access permission of the second user virtual memory address space in the REE are deactivated, the read access to be activated and the write access to be deactivated.

12. The electronic device of claim 11, wherein the instructions, when executed by the at least one processor, further cause the at least one processor to:
identify, by the TEE manager, the table of the TEE and the access permission of the first address space,
call a trusted application of the TEE in case that the data and the virtual memory addresses of the first address space and the second address space are stored in the table of the TEE, and the read access of the access permission of the first address space is configured to be activated and the write access thereof is configured to be deactivated, and
block, by the TEE manager, the call of the trusted application in case that the data and the virtual memory addresses of the first address space and the second address space are nor stored in the table of the TEE, and/or the write access of the access permission of the first address space is configured to be activated.

13. The electronic device of claim 1,
wherein the first address space comprises an address space allocated to be used to transmit data between the REE and the TEE, and
wherein the second address space comprises an address space allocated to switch from a user space of the REE to a secure space of the TEE.

14. A method for protecting memory of an electronic device, the method comprising:
allocating a first address space and a second address space to the memory in a rich execution environment (REE) based on detecting a request to write data to the memory;
writing the data to the first address space of the memory and then detecting access to the second address space in the REE;
configuring an access permission of a first user virtual memory address space, mapped to the first address space in the memory, in the REE so that write access is deactivated by a trusted execution environment (TEE) manager based on detecting the access to the second address space, and configuring an access permission of a second user virtual memory address space, mapped to the second address space, in the REE so that read access is activated and write access is deactivated; and
configuring an access permission of a first kernel virtual memory address space, mapped to the first address space in the memory, in the REE so that write access is deactivated by the TEE manager.

15. The method of claim 14, further comprising:
mapping, by a kernel of the REE, the first address space and the second address space of the memory to the first user virtual memory address space and the second user virtual memory address space of a first page table in the REE after allocating the first address space and the second address space; and
mapping, by the kernel of the REE, the first address space and the second address space of the memory to the first kernel virtual memory address space and the second kernel virtual memory address space of a second page table in the REE.

16. The method of claim 15, further comprising:
configuring the access permission of the first user virtual memory address space, the access permission of the second user virtual memory address space, the access permission of the first kernel virtual memory address space, and the access permission of the second kernel virtual memory address space so that read access and write access are activated (read-writable).

17. The method of claim 16, further comprising:
transmitting the data, virtual memory addresses of the first address space and the second address space, and memory space information of a process managed by the kernel to the TEE manager through a driver of the REE;
generating, by the TEE manager, a first hash value for a static region of a client application in the REE based on the memory space information of the process;
comparing, by the TEE manager, the first hash value with a previously stored second hash value for a virtual memory address of the static region; and
performing, by the TEE manager, first caller authentication that verifies a loaded page of the static region based on whether the first hash value and the previously stored second hash value are equal to each other.

18. The method of claim 17, further comprising:
configuring, by the TEE manager, a state in which the read access and the write access for the second user virtual memory address space in the REE, mapped to the second address space of the memory, are activated to be changed a state in which the read access and the write access are deactivated;
allowing an access permission fault to occur in the second address space based on detecting access to the second address space in the state in which read access and write access for the access permission of the second user virtual memory address space, mapped to the second address space of the memory, are deactivated in the REE;
calling the TEE manager based on the occurrence of the access permission fault;
determining, by the TEE manager, whether the access permission fault has occurred in the second address space of the memory;
identifying, by the TEE manager, a specific bit of a page descriptor based on determining that the access permission fault has occurred in the second address space of the memory; and
performing, by the TEE manager, second caller authentication that verifies the loaded page of the static region in which the first caller authentication has not been performed based on the specific bit.

19. The method of claim 18,
wherein the performing of the second caller authentication comprises:
generating, by the TEE manager, a third hash value for the loaded page of the static region in which the first caller authentication has not been performed,
comparing, by the TEE manager, the previously stored second hash value for the virtual memory address of the static region and the generated third hash value, and
performing, by the TEE manager, the second caller authentication that verifies the loaded page of the static region in which the first caller authentication has not been performed, based on whether the previously stored second hash value and the third hash value are equal to each other, and
wherein the configuring of the access permission of the second user virtual memory address space so that the read access is activated and the write access is deactivated comprises:
determining, by the TEE manager, that the second caller authentication has been successfully performed in case that the previously stored second hash value and the third hash value are equal to each other, and
changing, in the state in which the read access and the write access for the access permission of the second user virtual memory address space in the REE are deactivated, the read access to be activated and the write access to be deactivated.

20. The method of claim 19, further comprising:
identifying, by the TEE manager, a table of the TEE and the access permission of the first address space;
calling a trusted application of the TEE in case that the data and the virtual memory addresses of the first address space and the second address space are stored in the table of the TEE, and the read access of the access permission of the first address space is configured to be activated and the write access thereof is configured to be deactivated; and
blocking, by the TEE manager, the call of the trusted application in case that the data and the virtual memory addresses of the first address space and the second address space are nor stored in the table of the TEE, and/or the write access of the access permission of the first address space is configured to be activated.

* * * * *